United States Patent
Buchheit et al.

(10) Patent No.: US 9,769,415 B1
(45) Date of Patent: Sep. 19, 2017

(54) BANDWIDTH OPTIMIZED CHANNEL SURFING AND INTERFACE THEREOF

(76) Inventors: Brian K. Buchheit, Davie, FL (US); Scott M. Garrett, Weston, FL (US)

(*) Notice: Subject to any disclaimer, the term of this patent is extended or adjusted under 35 U.S.C. 154(b) by 821 days.

(21) Appl. No.: 13/483,801

(22) Filed: May 30, 2012

Related U.S. Application Data

(60) Provisional application No. 61/491,526, filed on May 31, 2011.

(51) Int. Cl.
| | |
|---|---|
| *G06F 3/00* | (2006.01) |
| *G06F 13/00* | (2006.01) |
| *H04N 5/445* | (2011.01) |
| *H04N 5/50* | (2006.01) |
| *H04N 5/45* | (2011.01) |

(52) U.S. Cl.
CPC .............. *H04N 5/50* (2013.01); *H04N 5/45* (2013.01)

(58) Field of Classification Search
CPC .............................. H04N 21/50; H04N 21/45
See application file for complete search history.

(56) References Cited

U.S. PATENT DOCUMENTS

| | | | |
|---|---|---|---|
| 2006/0075428 A1* | 4/2006 | Farmer et al. | 725/38 |
| 2007/0174880 A1* | 7/2007 | Fite et al. | 725/87 |
| 2007/0204320 A1* | 8/2007 | Wu et al. | 725/135 |
| 2008/0134249 A1* | 6/2008 | Yang et al. | 725/46 |
| 2009/0322962 A1* | 12/2009 | Weeks | 348/726 |
| 2010/0033626 A1* | 2/2010 | Jang et al. | 348/469 |
| 2010/0037267 A1* | 2/2010 | Bennett | 725/56 |
| 2010/0158109 A1* | 6/2010 | Dahlby et al. | 375/240.03 |

* cited by examiner

*Primary Examiner* — Oschta Montoya
(74) *Attorney, Agent, or Firm* — Patents on Demand P.A.; Brian K. Buchheit; Scott M. Garrett

(57) ABSTRACT

Bandwidth optimized channel surfing allow users to experience channel surfing without delay between switching channels when buffering delays are a concern. Audio associated with the surfed channel can be presented to the user in full. Video can be presented at lower frame rates per second than for continuous video. Video sampling or channel surfing mode can mean, for example, that 5 frames per second are displayed to the user. Main video viewing mode can display the full 24 or more frames per second that continuous video is presented at. An interface for channel surfing can determine an automatic switch back to full video. This switch back to full frames per second can occur when a user has hovered over a channel being surfed for a pre-determined amount of time. A user interactive selection of the channel can also result in the switch from channel surfing to main video viewing mode.

20 Claims, 4 Drawing Sheets

BANDWIDTH OPTIMIZED CHANNEL SURFING AND INTERFACE THEREOF

CROSS REFERENCE TO RELATED APPLICATIONS

This non-provisional application claims the benefit of U.S. Provisional Patent Application No. 61/491,526 filed 31 May 2011 entitled "Bandwidth Optimized Channel Surfing and Interface Thereof".

BACKGROUND

The field of the disclosure is the field of Internet Protocol (IP) based television, and more specifically a bandwidth efficient channel surfing mode and TV guide or interface thereof.

Conventional television broadcasting has been moved from analog broadcast to a digital broadcast, referred to digital TV, or "DTV," as of Jun. 12, 2009. Furthermore, in community antenna television (CATV) systems, often referred to as "cable" television, digital channels are increasingly common for both standard and premium subscription packages. IP based television uses internet carrier. Analog and digital broadcast and CATV television suffers from bandwidth utilization inefficiencies since there must be enough bandwidth available in a given transmission medium to accommodate all channels at once, even though a user is only watching one channel. In contrast, IP based television services are more bandwidth efficient since only the selected channel or video content is streamed to the viewer. However, IP based services are subject to delays in content display when initialized due to bandwidth constraints. This is especially true for streaming larger files, high fidelity content, and when surfing channels by searching among them to find desired viewing content, often referred to as "channel surfing."

Cable and satellite television service companies utilizing digital broadcast delivery provide end users with the same encoded content over the same set of channels at all times. Providers install a cable box that is programmed to "filter" channels and tune into them by decoding user selected channels in real time. Different decoders can be utilized for different channel packages to ensure end users only have access to the channels in the package they are paying for. This real time decoding is beneficial for cable providers but introduces a slight initial time delay when presenting content. However, real time decoding delays the display of content only by a minute amount that is rarely noted by users. Since content is broadcast at all times, even when the end user device is turned off, there is no perceived bothersome delay to the user upon turning the device on or when channel surfing.

In contrast, delay in providing requested video content is a significant user concern with IP based television and similar streamed video programming (such as NETFLIX, HULU, TV from mobile devices, and the like). Due to the multicast nature of IP television, a certain amount of required "buffer" time delays the video stream playback in addition to a minute real time decoding delay. To ensure a smooth continuous delivery of video content over an IP based infrastructure, the difference between what the available bandwidth can sustain for smooth playback and the bandwidth availability measure that the video was encoded for is downloaded prior to the start of video playback. Should bandwidth availability decrease during playback, the video is paused and additional buffering is required.

This buffering delay will always be required so long as the available bandwidth pipeline is not significantly larger (i.e., by several magnitudes larger) than what a typical TV channel requires in terms of download capacity. Buffering delays are annoying in general. For channel surfing, these buffering delays are not only annoying but also prohibitive from an end user perspective. Should a user decide not to watch the selected video content in full, he or she has just spent a certain amount of time waiting for content to load for nothing. He or she will have to wait again for a new channel to buffer before deciding if the new channel's content is the user desired video content.

SUMMARY

One embodiment of the disclosure presents bandwidth optimized channel surfing. To limit the buffering delay while switching channels, one embodiment of the disclosure can limit the number of frames per second (or seconds per frame) decoded and displayed to the user per channel while in a channel surfing mode. At the same time, full audio can still be provided for the channel currently being surfed. Audio streaming can be unaffected as it is commonly decoded separately from the video stream and synched utilizing markers along the video stream. For channel surfing purposes, synchronization of the audio stream to the displayed video sample is not a concern.

In one embodiment, the exact number of frames per second displayed for the video sample in channel surfing mode can be adjusted according to user preference. In another embodiment of the disclosure, a stipulation that only a fraction or selection of the I frames of the compressed and encoded video sequence are to be displayed can be implemented. For channel surfing purposes all B and P frames, which are dependent on information in I frames for decoding and decompression, can be dropped. This drop can save time usually necessary for algorithms to reconstruct compressed dependent B and P frames before displaying them. Since a video subjected to lossy compression can never be fully restored to its original form, the drop in B and P frames can also guarantee only higher quality frames are being shown in channel surfing mode.

Another embodiment of the disclosure presents an interface for efficient and bandwidth optimized channel surfing. The interface can visually and in behavior mimic a conventional user friendly digital television channel guide. Users can thus perceive no difference between digitally offered and IP based television. An end user can, on a single display, view video samples (i.e., select frames) of one or more channel options. The video sample is displayed at a lower display of frames per second than required for seamless, fluid video viewing. Full audio can be streamed for the channel selection the user selector is at the time hovering at.

This channel surfing mode can be terminated and viewing experience can return to full video viewing mode seamlessly. In one embodiment, termination of channel surfing mode can occur automatically after a user has hovered over a channel for a predetermined amount of time. In another embodiment, a user interactive selection (such as a remote control confirmation) can be required to switch to channel surfing mode or return to full video viewing mode.

DETAILED DESCRIPTION

Figure 1:
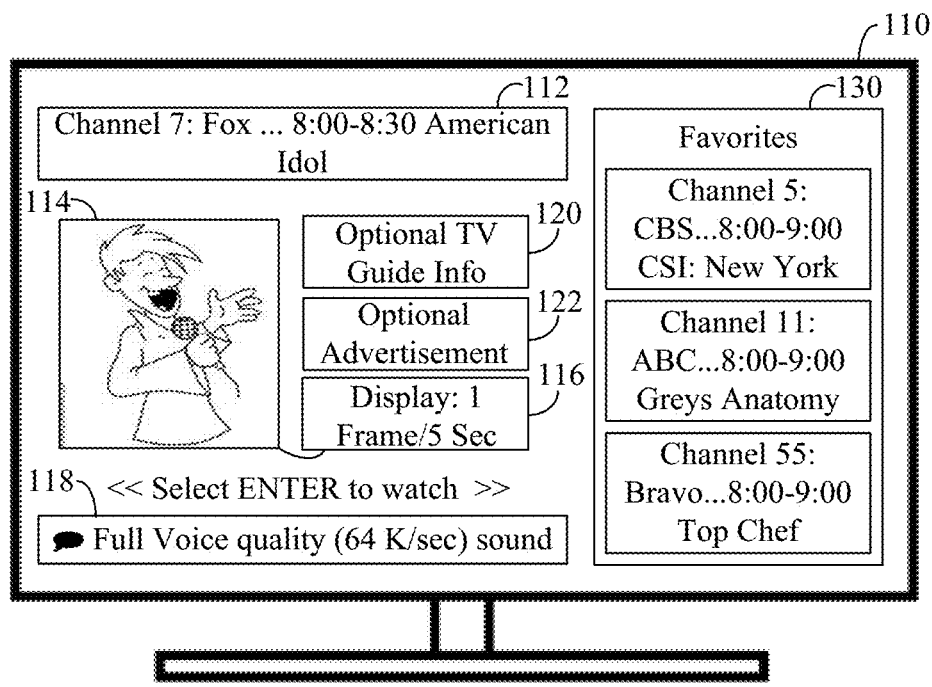
FIG. 1 shows a GUI for bandwidth optimized channel surfing in accordance with an embodiment of the inventive arrangements disclosed herein.

As mentioned previously, conventional cable television such as digital television is supplied via broadcast. That is the same content is sent to all end user devices at all times (even when the devices are turned off). Hence, while digital broadcasting has advantages over analog television (such as allowing more channels to be broadcast across the same amount of total bandwidth), it still uses broadcast routing. This is a painfully inefficient and costly use of both bandwidth and supporting resources.

IP based television can utilize multicast routing, which is bandwidth and resource efficient. Utilizing multicast routing, a single packet only needs to be sent once by the source, without knowing the number or location of all end user recipients. Nodes within the network will replicate and pass on the packet as necessary when requested by end user devices. There is no continual streaming of all potentially demanded video content simultaneously to all end user devices.

However, as discussed, IP based television provided video is subject to undesirable buffering delays. These delays are due to the fact that a conventional television channel requires roughly 2.5 mb/s to 4 mb/s download capacity for standard definition and 10 mb/s to 19 mb/s for high definition content. Each second includes a standard 30 frames per second of motion video.

Unless bandwidth availability is magnitudes larger than these download capacity requirements, buffering delays will be a part of desired video content presentation, even if only a small portion (such as one or two seconds) of the motion video is to be displayed. These buffering delays become especially evident when first initializing a specific "channel" or video content. To users these delays are unacceptable and overall perceived as an undesirably bad connection. As such, channel surfing in IP based television is undesirable. This presents a significant barrier to entry for full scale industry adaptation of IP based television.

In addressing the problem of responsiveness from a user perspective, the present disclosure contemplates a bandwidth efficient channel surfing mode or interface. Eliminating a majority of the presented motion video frames in channel surfing mode cuts down on the download capacity required for channel surfing mode. Displaying still images (frames) from the motion video stream consecutively rather than streaming motion video content demands less bandwidth capacity.

For example, displaying 1 frame per 5 seconds instead of the conventional standard of 30 frames per second results in savings of 1:150. Instead of the roughly 4 mb/s capacity per channel, only around 90 kb/s are necessary per channel after the channel surfing mode adjustment. The roughly 90 kb/s also includes a standard full audio channel (usually around 64 kb/s). End users can be presented with a good approximation of current channel surfing available in digital television. Instead of a full motion video presentation, however, viewers can be shown time-lapsed images from the channel's overall video stream. The audio channel can be unaffected.

For the purposes of the present disclosure channel surfing describes a user's changing of available television of video content channels to determine which offered video content to watch. Conventionally, channel surfing can be achieved in a variety of ways. For instance, a user can select to simply utilize the channel up and down feature of his or her specific device or remote for the specific device. Another option can be for a user to input a specific channel number to change channels and view what is currently being shown on the newly selected channel.

Yet another option users have is to call upon a TV guide channel or interface. The TV guide channel or interface can conventionally list (in text form) all currently shown video content across all network channels. Optionally, there can be a picture in picture (pip) display of the channel the user was watching before selecting the TV guide. Audio can accompany the pip video. The user can change channels by selecting a text representation of a channel from the listing displayed or inputting a channel designated number directly through the device or device's remote control. Users have become accustomed to this type of channel surfing interface (its layout, functionality, etc.) so keeping with an overall similar design for a bandwidth efficient IP based television channel surfing interface is beneficial.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) where the software embodiment can include a storage medium (which can be a tangible, physical, non-transitory storage medium) within which the software resides, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer program stored on a computer readable storage medium may be propagated over a distance via a computer readable signal medium.

The computer readable storage medium can be a tangible, non-transitory medium. The computer readable storage medium can be a physical device or part of a physical device in which information is digitally encoded. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a GUI 100 for bandwidth optimized channel surfing in accordance with an embodiment of the inventive arrangements disclosed herein. The GUI can be implemented on any device 110 that can be utilized for IP based television services. IP television services, as used here, refers to the delivery of audio/video content from sources that either conventional television programming (shows at prescribed times) and "on demand" services that allows viewers to select a program, show, or episode for viewing. The audio/video content is transmitted via one or more IP compliant network. Device 110 can be any internet enabled device with a display screen, such as, for example, a tablet, a personal computer, a smart phone, a media player, a gaming system, a television, and the like. Device 110 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

A channel indicator 112 can list the current user selected channel before implementation of the channel surfing mode GUI 100. Channels can be, but are not restricted to, content provided by television content providers such as COMCAST, VERIZON, etc. In another embodiment, channels can be provided directly by the content creator and need not be bundled for purchase through a third party. For example, CBS or ABC can offer channel access to an end user directly. Alternatively, content providers may utilize a single service to offer their channels and accept payments for their specific channels. This can allow users to build a more customized channel package (not possible with current providers) with a single bill (as is conventionally done). Traditionally a "channel" in television refers to a frequency band where a television signal is transmitted, as well as a number designation, such as, for example, "channel 6." The number designations can refer to, or correspond with, different frequency bands in different transmission media. For IP television, however, the term "channel" is a carryover from broadcast and CATV services. Clearly frequency divisions have no meaning in internet, packet-based networks, rather, for internet communication, a Uniform Resource Locator (URL) or Uniform Resource Indicator (URI) is analogous to a channel, and number designators can be assigned to different URLs/URIs or sets of URLs/URIs in an IP television interface.

Time-lapsed video content display 114 reflects still images or frames from the motion video stream for the currently selected channel and programming information described in channel indicator 112. Utilizing only select frames per second or even showing only a select still frame for a set of seconds before updating the content with a new still image from the motion video content allows the channel surfing GUI to provide users with a responsive and "familiar" interface for IP based television. Frame display adjustment option 116 allows a user to optimize his or her viewing experience by selecting a personalized frames/second rate for the time-lapsed motion video display. The interface can default to displaying 1 frame per 5 seconds before updating the still image and as such reduce bandwidth required for the selected channel.

The time-lapsed video content display 114 can be accompanied by full voice quality audio 118 for the channel being channel surfed just as an internet radio station would provide sound. Voice channels require a much smaller degree of bandwidth (conventionally 64 Kb/sec). Full voice quality sound can, with the time-lapsed motion video content display, provide the user with an appropriate preview of the channel programming. The purpose of the interface enhanced with the picture and sound is to better inform users of their programming choices while channel surfing in the IP based television environment with the feel of familiar interfaces.

An optional TV Guide Information 120 field can be filled with more detailed programming information. The optional information 120 can be television show or movie summaries, ratings provided by the user or content provider selected review agencies (such as Rotten Tomatoes, and the like). In another embodiment the optional information can be suggested ratings for a provided video content on an IP based television channel that can be determined from previous user behavior (which channels or programs a user prefers to watch at a given time for a given day of the week). For example, should a user often select to watch episodes of "Dancing with the Stars", the optional TV Guide information 120 can point to episodes of "Skating with the Stars" or "Celebrity Apprentice" as a probable new show to the user's liking.

The GUI for bandwidth efficient channel surfing can also include optional advertisement(s) 122. The advertisements, which do not include sound, can be similar in nature to GOOGLE ads (which are based on content in a user's email or search history). Advertisement(s) 122 can also, in one embodiment, be related to the content being provided (for example, the shows being presented, products seen in the show such as clothing articles, furniture articles, electronic devices, and the like). Advertisement(s) 122 can be unobtrusive (to the user's channel surfing experience) in nature. They can be, but are not limited to, text, small images or can include or present a link for users to select.

Optionally, the interface 100 can also include an additional panel 130 that can keep track of a user's favorite channels. Favorite channels can be determined by, for example, specific user selection for inclusion or user surfing/watching habits. The content for user favorite channels can be loaded and ready for user access. This can reduce any potential lag in full motion video presentation upon initiating "large" jumping of channels (for example, from channel 7 to channel 55).

In another embodiment, panel 130 can include the 5 closest channels to the currently viewed channel to allow fast switching between these channels. An additional benefit is that users can readily view all content being offered before calling upon time-lapsed video and audio content for the channel in channel surfing mode. Favorite channels presented in panel 130 can be further tuned by day of the week or time of day based on user preferences.

In yet another embodiment, panel 130 can display a user selected content lime-up. For example, a user may pre-select content that will be streamed in successive timeslots for auto-tuning wherein the channel surfing guide can automatically tune to the selected channel for the selected time slot. As such, a user may experience a smoother channel surfing experience when his or her selected channels for an evening are preloaded before a specific content is set to begin. More specifically, a user may choose to view the show "American Idol" from 8 pm to 9 pm on channel 5, followed by the show "The Voice" from 9 pm to 10 pm on channel 70, etc. With both shows preloaded and auto-tuning the user can experience a seamless transition from one show to the next without obtrusive delays.

Figure 2:
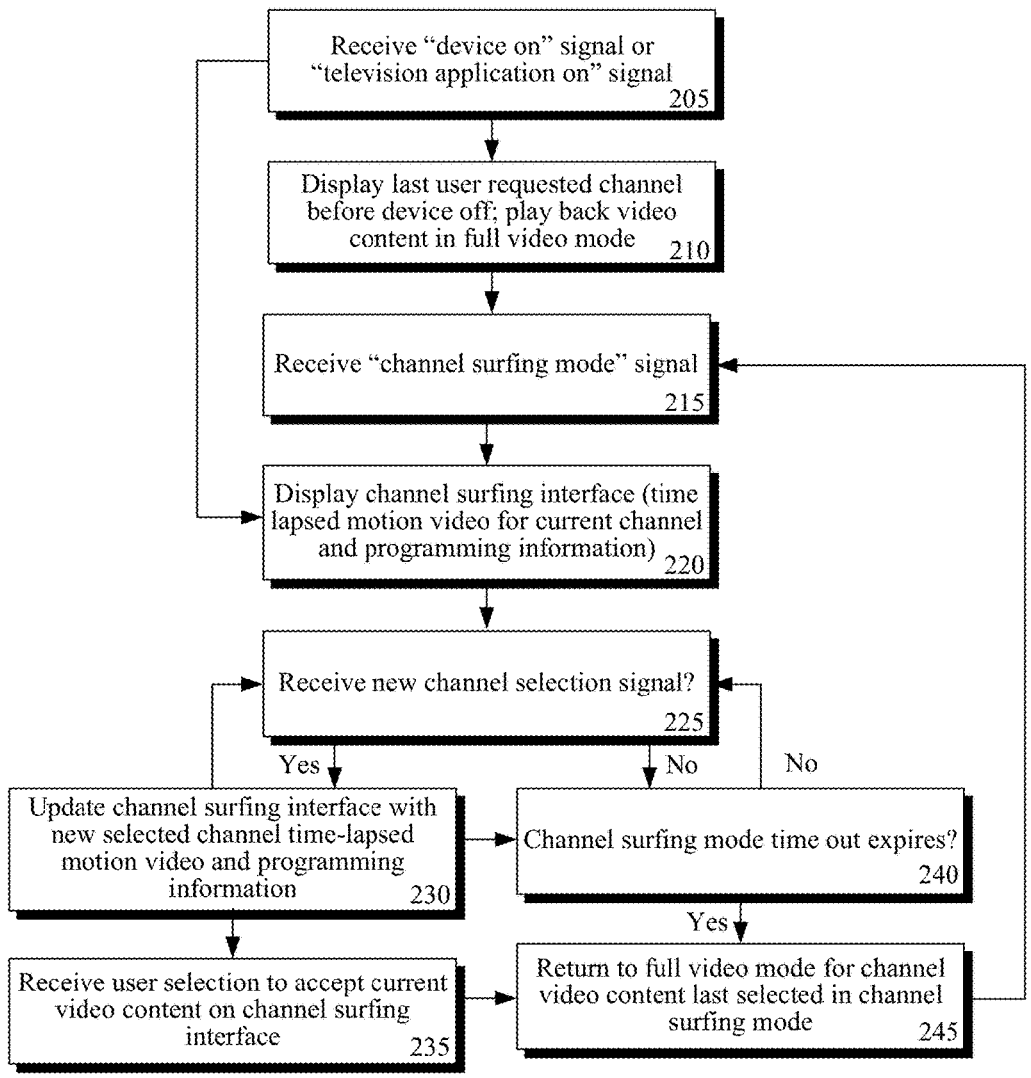
FIG. 2 shows a flowchart of a method for bandwidth optimized channel surfing from the device perspective in accordance with an embodiment of the inventive arrangements disclosed herein.

FIG. 2 shows a flowchart of a method for bandwidth optimized channel surfing from the device perspective in accordance with an embodiment of the inventive arrangements disclosed herein. The method can be applied for devices dedicated solely to IP based television display (much like televisions connected to the internet via an optional IPTV set top box or net top box) or multipurpose devices such as IPADs, laptops, smartphones, etc.

In step 205, the device can receive a "device on" signal if previously turned off or a "television application on" signal should the device be a multipurpose device and a user selects to activate an IP based television application for the device. In step 210, the device can display the last user requested channel before the device or application was previously powered down. This can result in play back of the video content of that specific channel in full video mode.

Upon receiving a channel surfing model signal in step 215, the channel surfing interface can be displayed in step 220. A channel surfing mode signal can be any conventional means of calling upon a change of channel for a television device, such as but not limited to a user opting to utilize the channel up or down button on the device or the device's remote control. A user can also decide to input the desired channel's designated number. A further option a user can have is to select a dedicated TV guide or channel surfing button or command on the device or the device's remote control.

Alternatively, the process can move from step 205 directly to step 220 and display the bandwidth optimized channel surfing interface (displayed in channel surfing mode) at initialization. This can serve to save a buffering delay that can occur when first activating the IP based television service. It can also save the user the additional step of calling upon the channel surfing guide to determine which of the currently offered IP based television content to select for viewing. As will be discussed in FIG. 3, a user may configure his or her own unique preferences.

In step 225 the device can determine whether or not it has received a user initiated request for a new channel selection (compared to the channel information currently displayed via the channel surfing interface). The current information or programming information can include broadcast information such as broadcast time of the video content being surfed, information for adjacent channels (in the bandwidth), advertisements (in the form of soundless links or text content that a user can select), and the like. As previously mentioned, advertisements can be but are not limited to related to the content of the video being surfed, or user behavior such as past user video content selection history, browsing history, purchase history, etc.

After receiving a new channel selection signal in step 225, the process can move to step 230. In step 230, the device can update the channel surfing interface with the newly selected channel's time—lapsed motion video and programming information. The time-lapsed video is presented, again, at the reduced frames per second rate, for example, at one frame per five seconds. The process can repeat upon the device receiving yet another new channel selection signal or move onto step 235 or step 240.

In step 235 the device can determine whether or not the channel surfing mode time out expires. If the time out has not expired the process can return to step 225. Alternatively, if the channel surfing mode has not expired, the process can proceed to step 240 in which the device can receive a user selection to accept the current video content/programming displayed on the channel surfing interface.

From step 240, as well as if the channel surfing mode did indeed time out in step 235, the device can, in step 245, return to full video mode. This full video mode is either for the user's actively selected channel from step 240 or the last selected/displayed channel information in the channel surfing interface. Step 245 can be terminated upon receipt of another channel surfing mode signal receipt in step 215.

Figure 3:
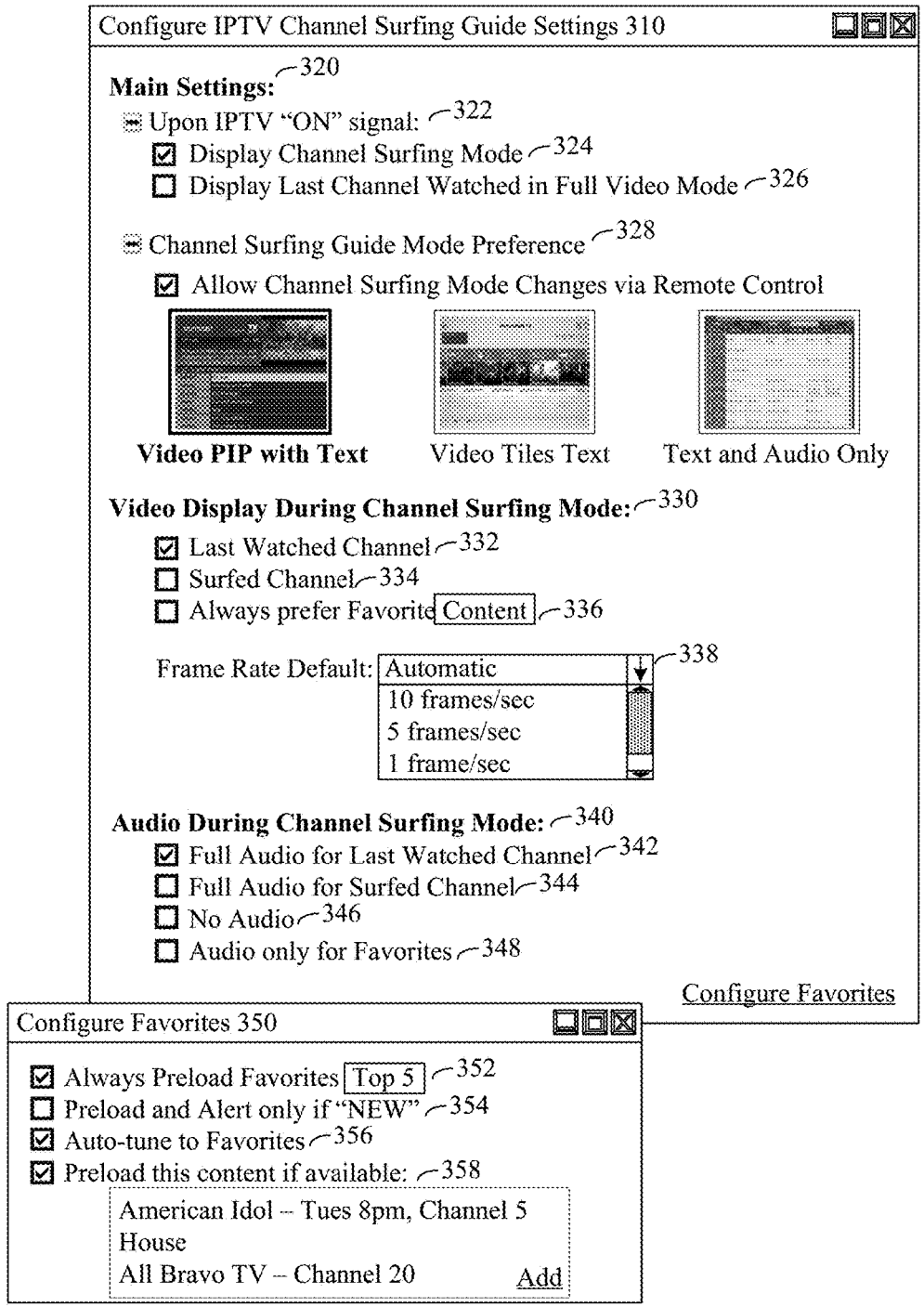
FIG. 3 is a depiction of exemplary GUIs for user customization for a bandwidth optimized channel surfing guide in accordance with an embodiment of the inventive arrangements disclosed herein.

FIG. 3 is a depiction of exemplary GUIs 310, 350 for user customization for a bandwidth optimized channel surfing guide in accordance with an embodiment of the inventive arrangements disclosed herein. It should be noted that GUIs 310, 350 are not intended to be limiting and other options or configuration GUI display are contemplated.

GUI 310 can allow for a user to configure his or her IPTV channel surfing guide settings. User preference configuration can allow for a more seamless and customized experience of IPTV based channel surfing for a user. Exemplary configuration settings can be a set of main settings 320, such as which content to present to the user upon an IP based television "ON" signal 322 (be that an IPTV application activation or an IPTV dedicated device power on signal).

For example, in one embodiment a user may select to have the channel surfing mode displayed 324 to him or her every time IP based television is activated. Another selection can be to by default display the user's last selected channel in full video mode 326. Other options linked to configured favorites can be contemplated. For example, should one of the user's favorite content be offered at the time the IPTV is signaled to activate, the channel surfing guide can be configured to automatically tune to the channel offering this content.

Another main setting 320 available to a user for customization can be the layout/content of the channel surfing guide. Such configurations can be options such as displaying video pip of a last channel watched, displaying video tiles of a set number of channels that are next to one another in a lineup or video tiles of a user's favorite channels, or a text and audio only option with the ability to preview video of a selected channel. It should be noted that all of the video shown on the channel surfing guide is, in accordance with the disclosure, at reduced frame rates or time lagged to avoid buffering delays that would negatively impact a user experience with a channel surfing guide.

Additionally, video display during channel surfing mode 330 can be configured. For example, video display in the video pip with text mode for channel surfing guide display mode 328 can be time lagged content of the last watched channel 332 or the currently surfed channel 334 (activated when a user has hovered over a text or still image representation of the IP based television content for a select amount of time). Another configuration option for a user can be to select an option of displaying frame rate reduced video for favorite channels only 336 or conversely for only unknown or not favorite channels.

The reduced frame rate video can be configured to utilize a user selected frame rate default 338 for display when allowed by the channel surfing guide provider. For example, a user may select to have the frame rate default to be automatically determined based on his or her available bandwidth and preference settings, or select to have a video display frame rate for channel surfing to be at a consistent 5 frames per second, 1 frame per second, etc.

As mentioned previously, audio for the time lapsed or reduced frame rate video displayed in channel during mode can be unaffected. A user may still decide on a number of configuration options for audio during channel surfing mode 340. For example, a user may wish to continue to listen to full audio for the previously watched channel 342 even if his or her channel guide can be displaying video still images or reduced frame rate video of other content. In this manner the user can remain aware of the progress of the last watched channel while also exploring other IPTV based offered content. In another embodiment, the user may select to have the full audio for the currently surfed channel 344 be played back to augment the information presented through the reduced frame rate video in channel surfing mode. In yet another embodiment, a user may select to have no audio 346.

Additional configurations for favorite channels such as displayed in GUI 350 are contemplated. Options for favorite channels can include guidelines for when to mark a channel as a favorite channel, options for managing these favorite channels or content list, and the like. Options regarding favorite content or channels pertaining to the configuration of the IPTV channel surfing guide can include options such as always preloading favorites 352 (for example the top 5 favorite channels or content, which can be as previously mentioned determined by user watching behavior or user specific manipulation of favorites). Another option can be to select for the channel surfing guide to preload and alert the user only if the favorite content is "NEW" 354 (meaning a new episode of a favorite TV show rather than reruns of already broadcast content. The user may wish to also select an option to automatically tune to his or her favorites 356 or preload specific content should it be available 358. Content to preload can be a specific channel regardless of the content offered at the moment or a specific content (with or without a timeslot stipulation). It should be noted that other GUIs and settings for configuration of IPTV channel surfing guide are contemplated.

Figure 4:
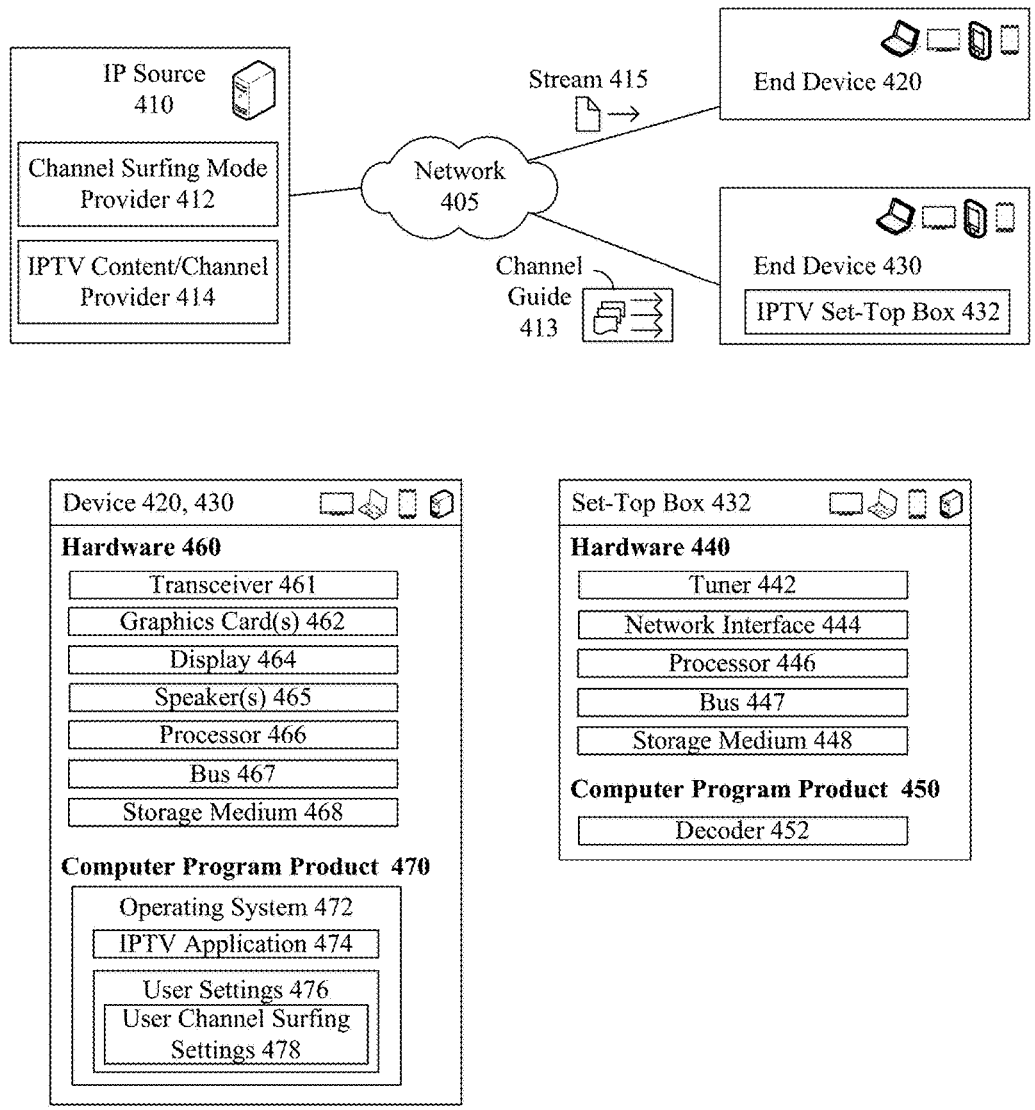
FIG. 4 is a schematic diagram of a system for enabling bandwidth optimized channel surfing and guide thereof in accordance with an embodiment of the inventive arrangements disclosed herein.

FIG. 4 is a schematic diagram of a system 400 for enabling bandwidth optimized channel surfing and guide thereof in accordance with an embodiment of the inventive arrangements disclosed herein. System 400 shows a number of end devices 420, 430 interacting with IP server 410 over network 405 for providing IP based television content to end device 420, 430 user in accordance with an embodiment of the disclosure.

IP Source 410 can act as both an IPTV channel surfing mode provider 412 as well as an IPTV content/channel provider 412. For example, IP Source 410 can provide end device 420 with stream 415 of specifically selected media while it can provide end device 430 with a channel surfing guide 413 mode if selected by end device 430 user. In another embodiment, the system can have a more distributed network architecture where the IPTV Content/Channel Provider 414 can be a number of different IPTV servers and a channel surfing mode provider 412 can summarize and present the available options on the various distributed IPTV servers. This type of architecture also functions to allow content providers to directly provide end users with their content without a third party contract requirement such as COMCAST or VERIZON, etc. In this embodiment, channel surfing mode provider 412 can act as a summary of the content available to the user (paid content directly from the content owner as well as free content).

End devices 420, 430 can include hardware 460 and one or more computer program products 470. In one embodiment the end device 430 can be connected to a set top box 432 dedicated to providing the end device with IP based television content. In another embodiment, the computing device 420 need not be connected to such a net top box and can incorporate all the hardware and software to provide full IP based TV.

The computing device 420, 430 can be any mobile apparatus or device capable of providing a user with IP based television content. The computing device 420, 430 can be, but is not limited to, a personal computer, a smart phone, and the like. Device 110 can be a general purpose computing device able to have its functionality modified by updating or changing installed applications, can be a special purpose computing device designed for a specific set of functionality that is not user modifiable (or minimally so, such as through a firmware upgrade), or can be a device with an intermediate level of user modifiability (i.e., plug-ins or apps can be installed by a user who is otherwise not able to modify core functionality of the device).

The hardware 460 can include graphics card(s) 462, display 463, and audio output 464, which can function together and along with computer program product 470 to render IPTV based video and allow for audio output along with video presented on the display 463. The hardware 460 can also include one or more processors 465 able to execute programmatic instructions of one or more computer program products 470. The processor 465 can be connected to other hardware 460 components, which include storage medium 468, via a bus 466. Storage medium 468 can be a non-transitory storage medium, such as a hard drive, Random Access Memory (RAM), a solid state drive, an optical storage medium (DVD disk, BLU-RAY disk), and the like. Hardware 460 can include ports for interacting with external output (e.g., transceiver 461) components or can include one or more embedded or integrated output components (transceiver 461, audio output 464).

The computer program products 470 of computing device 420, 430 can include an operating system 472, an IPTV application 47 executing on top of the operating system, firmware, and the like. Computer program product 470 can further include user settings 476, and more specifically user channel surfing settings 478. It should be noted that for device 420 when not connected to an IPTV set top box, IPTV application 474 can also include decoding capabilities for decoding incoming IPTV based content for proper presentation.

For device 430, when directly connected to set top box 432, the set-top box can include hardware 440 such as tuner 442, network interface 444, processor 446, bus 447 and storage medium 448 as well as computer program product 450 including a decoder 452 to receive, decode and present IPTV based content to a user via device 430. As mentioned, the one or more processors 446 can be able to execute programmatic instructions of one or more computer program products 450. The processor 446 can be connected to other hardware 440 components, which include storage medium 448, via a bus 447. Storage medium 448 can be a non-transitory storage medium, such as a hard drive, Random Access Memory (RAM), a solid state drive, an optical storage medium (DVD disk, BLU-RAY disk), and the like. Hardware 460 can include ports for interacting with external output (e.g., network interface 444) components or can include one or more embedded or integrated output components (network interface 444).

As used herein, presented storage medium 448, 467 can be a physical or virtual storage space configured to store digital information. Storage medium 448, 467 can be physically implemented within any type of hardware including, but not limited to, a magnetic disk, an optical disk, a semiconductor memory, a digitally encoded plastic memory, a holographic memory, or any other recording medium. Storage medium 448, 467 can be a stand-alone storage unit as well as a storage unit formed from a plurality of physical devices. Additionally, information can be stored within storage medium 448, 467 in a variety of manners. For example, information can be stored within a database structure or can be stored within one or more files of a file storage system, where each file may or may not be indexed for information searching purposes. Further, storage medium 448, 467 can utilize one or more encryption mechanisms to protect stored information from unauthorized access.

Network 405 can include any hardware/software/and firmware necessary to convey data encoded within carrier waves. Data can be contained within analog or digital signals and conveyed though data or voice channels. Network 405 can include local components and data pathways necessary for communications to be exchanged among computing device components and between integrated device components and peripheral devices. Network 405 can also include network equipment, such as routers, data lines, hubs, and intermediary servers which together form a data network, such as the Internet. Network 405 can also include circuit-based communication components and mobile communication components, such as telephony switches, modems, cellular communication towers, and the like. Network 405 can include line based and/or wireless communication pathways.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for bandwidth efficient channel surfing, the computer program product comprising a non-transitory computer readable storage medium having computer usable program code embodied therewith, the computer usable program code comprising:

computer useable program code, stored in the non-transitory computer readable storage medium, for, upon being executed by one or more processors, a channel surfing mode for providing time-lapsed motion video content of an audio video program for display with full audio channel quality, wherein said time-lapsed motion video content of the audio video program is presented via a display to a user at a lower frame rate than is necessary for continuous motion video streaming, resulting in still images that are updated based on the frame rate utilized in channel surfing mode to save bandwidth, wherein during the channel surfing mode audio of the audio video program is played via an audio transducer at full audio channel quality; and computer useable program code, stored in the non-transitory computer readable storage medium, for, upon being executed by one or more processors, a full video mode, wherein the full video mode automatically activates once the channel surfing mode expires, and wherein the full video mode presents the audio video program via the display and the audio transducer to the user, wherein the frame rate of video of the full video mode for the audio video program is three or more times the lower frame rate, and wherein audio of the audio video program during the full video mode is played by the audio transducer at the full audio channel quality, wherein bandwidth consumed in delivering a time segment of video for the audio video program during full video mode is at least three time greater than bandwidth consumed in delivering a portion of video having a same duration as the time segment during channel surfing mode, wherein bandwidth consumed in delivering audio for the audio video program for the duration of the time segment is substantially equivalent whether in full video mode or in channel surfing mode.

2. The computer program product of claim 1, wherein said frame rate per second that is necessary for continuous motion video streaming is the NTSF standard of 30 frames/second.

3. The computer program product of claim 1, wherein said channel surfing mode frame rate per second is 1 frame/5 seconds.

4. The computer program product of claim 1, wherein said channel surfing mode frame rate per second is automatically determined and scaled based on available bandwidth.

5. The computer program product of claim 1, wherein said channel surfing mode is configured to pre-load content of a number of programming options during channel surfing mode.

6. The computer program product of claim 5, wherein said pre-loaded programming options are user selected programming options indicated as user favorite content.

7. The computer program product of claim 5, wherein said pre-loaded content of programming options are programming options on the channels surrounding the currently user surfed channel.

8. The computer program product of claim 7, wherein programming options are indicated as user favorite content by a manual user selection.

9. The computer program product of claim 7, wherein programming options are indicated as user favorite content by analysis of past user watching behavior.

10. A method of providing bandwidth efficient channel surfing, comprising:
    one or more processors, executing program instructions stored in one or more non-transitory storage mediums, responsive to receipt of a user input to change audio video program channels, switching a computing device with IP based television capabilities from a full video mode to a bandwidth efficient channel surfing mode, wherein when in the full video mode one or more audio video programs are presented with a video frame rate sufficient for continuous motion and are presented at full audio channel quality, wherein audio video programs presented in channel surfing mode are presented with a video frame rate at least three times slower than the video frame rate of the full video mode, wherein the audio video programs presented in channel surfing mode are presented with at the full audio channel quality;
    one or more processors, executing program instructions stored in one or more non-transitory storage mediums, requesting full motion video content from a content provider of IP based television; and
    one or more processors, executing program instructions stored in one or more non-transitory storage mediums, upon receipt of said full motion video content decoding said video content and displaying a fraction of video content, wherein the fraction is at most a third of the content depending on the difference between the frame rate of the video frame rate of the full video mode and the channel surfing mode, to a user in channel surfing mode, wherein said fraction of video content is accompanied with the full quality audio channel for said received full motion video content.

11. The method of claim 10, wherein said fraction of video content is a selection of still images from the motion video stream displayed and updated at a lower frames/second rate than the NTSF standard for continuous full motion video of 30 frames/second.

12. The method of claim 11, wherein said lower frames/second rate for video content selection display is automatically determined and implemented based on available bandwidth.

13. The method of claim 10, wherein said full quality audio channel is replaced in favor of a full quality audio channel for the user's last watched IPTV channel content.

14. The method of claim 10 further comprising:
    one or more processors, executing program instructions stored in one or more non-transitory storage mediums, receiving a user initiated channel surfing command;
    one or more processors, executing program instructions stored in one or more non-transitory storage mediums, upon receipt of said signal requesting the newly user selected full motion video content from a content provider of IP based television;
    one or more processors, executing program instructions stored in one or more non-transitory storage mediums, upon receipt of said video content replacing the previously displayed time-lapsed video content with a fraction of video content of said newly received video content; and
    one or more processors, executing program instructions stored in one or more non-transitory storage mediums, updating programming information displayed in the graphical user interface with information accompanying the newly displayed time-lapsed video content for the recently received new user selected channel content.

15. A system for providing bandwidth efficient channel surfing, comprising:
    a channel surfing mode server, comprising hardware and software, wherein the software is stored within and is executed by the hardware, providing a bandwidth efficient channel surfing mode;
    one or more content provider servers, comprising hardware and software, wherein the software is stored within and is executed by the hardware, providing IPTV content or channels;
    an end device, comprising hardware and software, wherein the software is stored within and is executed by the hardware, configured to present a user with IPTV based content, to responsive to receipt of a user input to change audio video programming channels to switch from a full video mode to a bandwidth efficient channel surfing mode, wherein when in the full video mode one or more audio video programs are presented with a video frame rate sufficient for continuous motion and are presented at full audio channel quality, wherein audio video programs presented in channel surfing mode are presented with a video frame rate at least three times slower than the video frame rate of the full video mode, wherein the audio video programs presented in channel surfing mode are presented with at the full audio channel quality, wherein, upon the end device requesting full motion video content and upon receiving said full motion video content, the end device decoding said video content and displaying a fraction of video content, wherein the fraction is at most a third of the content depending on the difference between the frame rate of the video frame rate of the full video mode and the channel surfing mode, to a user in channel surfing mode, wherein said fraction of video content is accompanied with the full quality audio channel for said received full motion video content;

responsive to receipt of a user input to change audio video program channels, switching a computing device with IP based television capabilities from a full video mode to a bandwidth efficient channel surfing mode.

16. The system of claim 15, wherein the fraction of video content is a selection of still images from the motion video stream displayed and updated at a lower frames/second rate than the NTSF standard for continuous full motion video of 30 frames/second.

17. The system of claim 15, wherein the channel surfing mode server and the one or more content provider servers are separate legal entities.

18. The system of claim 15, wherein the channel surfing mode server directly requests user selected content from the one or more content provider servers.

19. The system of claim 15, wherein the channel surfing mode server, upon content selection from the user, redirects the end device to request the selected IPTV content directly from the one or more content provider servers.

20. The system of claim 15, wherein the channel surfing mode server upon channel surfing mode activation on the end device pre-loads a number of channel provided content, wherein the pre-loaded content is a set of channels surrounding the last watched channel, or a set of user favorite channels based on past viewing behavior or user specific selection.

* * * * *